US012078070B1

(12) United States Patent
Heeter et al.

(10) Patent No.: US 12,078,070 B1
(45) Date of Patent: Sep. 3, 2024

(54) ADJUSTABLE AIR FLOW PLENUM WITH SLIDING DOORS FOR A FAN OF A GAS TURBINE ENGINE

(71) Applicants: Rolls-Royce North American Technologies Inc., Indianapolis, IN (US); Rolls-Royce Corporation, Indianapolis, IN (US)

(72) Inventors: Robert W. Heeter, Indianapolis, IN (US); Daniel E. Molnar, Jr., Indianapolis, IN (US); Jonathan M. Rivers, Indianapolis, IN (US)

(73) Assignees: Rolls-Royce North American Technologies Inc., Indianapolis, IN (US); Rolls-Royce Corporation, Indianapolis, IN (US)

( * ) Notice: Subject to any disclaimer, the term of this patent is extended or adjusted under 35 U.S.C. 154(b) by 0 days.

(21) Appl. No.: 18/234,656

(22) Filed: Aug. 16, 2023

(51) Int. Cl.
*F01D 25/24* (2006.01)
*F01D 17/14* (2006.01)

(52) U.S. Cl.
CPC ............. *F01D 17/14* (2013.01); *F01D 25/24* (2013.01); *F05D 2220/36* (2013.01); *F05D 2270/301* (2013.01)

(58) Field of Classification Search
CPC ...... F01D 25/24; F01D 17/14; F05D 2220/36; F05D 2270/301; F05D 2240/14; F05D 2240/12; F04D 29/563; F02K 3/06
See application file for complete search history.

(56) References Cited

U.S. PATENT DOCUMENTS

| | | | |
|---|---|---|---|
| 4,086,022 | A | 4/1978 | Freeman et al. |
| 5,137,419 | A | 8/1992 | Waterman |
| 5,762,470 | A | 6/1998 | Gelmedov et al. |
| 6,231,301 | B1 | 5/2001 | Barnett et al. |
| 6,409,470 | B2 | 6/2002 | Allford et al. |
| 6,497,551 | B1 | 12/2002 | Hand et al. |
| 6,514,039 | B1 | 2/2003 | Hand |
| 6,619,909 | B2 | 9/2003 | Barnett et al. |
| 6,648,591 | B2 | 11/2003 | Collins |
| 6,685,426 | B2 | 2/2004 | Clark |
| 6,736,594 | B2 | 5/2004 | Irie et al. |
| 6,832,890 | B2 | 12/2004 | Booth |
| 6,905,305 | B2 | 6/2005 | James |
| 6,935,833 | B2 | 8/2005 | Seitz |
| 7,186,072 | B2 | 3/2007 | Seitz |
| 7,210,905 | B2 | 5/2007 | Lapworth |
| 7,575,412 | B2 | 8/2009 | Seitz |
| 8,257,022 | B2 | 9/2012 | Guemmer |
| 8,419,355 | B2 | 4/2013 | Guemmer et al. |
| 8,602,720 | B2 | 12/2013 | Goswami et al. |

(Continued)

FOREIGN PATENT DOCUMENTS

| | | | |
|---|---|---|---|
| CN | 113217469 | A | 8/2021 |
| DE | 102007056953 | | 10/2015 |

(Continued)

*Primary Examiner* — David E Sosnowski
*Assistant Examiner* — Theodore C Ribadeneyra
(74) *Attorney, Agent, or Firm* — Barnes & Thornburg LLP

(57) ABSTRACT

A fan case assembly adapted for use with a gas turbine engine includes a case at extends circumferentially at least partway about an axis of the gas turbine engine and a plurality of vanes. The case is formed to define a plenum that that extends circumferentially at least partway about the axis. The plurality of vanes are arranged in the plenum and spaced apart circumferentially about the axis.

20 Claims, 7 Drawing Sheets

(56) References Cited

U.S. PATENT DOCUMENTS

| | | | |
|---|---|---|---|
| 8,845,269 | B2 | 9/2014 | Agneray et al. |
| 8,915,699 | B2 | 12/2014 | Brignole et al. |
| 9,638,213 | B2 | 5/2017 | Obrecht et al. |
| 9,651,060 | B2 | 5/2017 | Morel et al. |
| 9,957,976 | B2 | 5/2018 | Allford |
| 10,024,336 | B2 | 7/2018 | Obrecht et al. |
| 10,047,620 | B2 | 8/2018 | Giacche et al. |
| 10,378,550 | B2 | 8/2019 | Lim et al. |
| 10,450,869 | B2 | 10/2019 | Brignole et al. |
| 10,539,154 | B2 | 1/2020 | Mallina et al. |
| 11,078,805 | B2 | 8/2021 | Joly et al. |
| 11,092,030 | B2 | 8/2021 | Joly et al. |
| 11,131,322 | B2 | 9/2021 | Grothe et al. |
| 11,473,438 | B2 | 10/2022 | Reynolds et al. |
| 11,572,897 | B1 | 2/2023 | Duong et al. |
| 2007/0147989 | A1 | 6/2007 | Collins |
| 2008/0044273 | A1 | 2/2008 | Khalid |
| 2012/0315131 | A1 | 12/2012 | Mertens |

FOREIGN PATENT DOCUMENTS

| | | | |
|---|---|---|---|
| EP | 2434164 | | 3/2012 |
| EP | 3081779 | | 10/2016 |
| JP | 2003227497 | A | 8/2003 |
| KR | 200930757 | A | 3/2009 |

ADJUSTABLE AIR FLOW PLENUM WITH SLIDING DOORS FOR A FAN OF A GAS TURBINE ENGINE

STATEMENT REGARDING FEDERALLY SPONSORED RESEARCH OR DEVELOPMENT

Embodiments of the present disclosure were made with government support under Contract No. FA8650-19-D-2063 or FA8650-19-F-2078. The government may have certain rights.

FIELD OF THE DISCLOSURE

The present disclosure relates generally to gas turbine engines, and more specifically to fan assemblies for gas turbine engines.

BACKGROUND

Gas turbine engines are used to power aircraft, watercraft, power generators, and the like. Gas turbine engines typically include a compressor, a combustor, and a turbine. The compressor compresses air drawn into the engine and delivers high pressure air to the combustor. In the combustor, fuel is mixed with the high pressure air and is ignited. Products of the combustion reaction in the combustor are directed into the turbine where work is extracted to drive the compressor and, sometimes, an output shaft. Left-over products of the combustion are exhausted out of the turbine and may provide thrust in some applications.

In embedded gas turbine engine applications, the engine may experience high distortion in the form of pressure gradients and swirl. The pressure and swirl distortions may cause engine stall or other undesirable aeromechanical behavior. The fan of the gas turbine engine may include mitigation systems to reduce negative effects of pressure and swirl distortions to improve stall margin.

SUMMARY

The present disclosure may comprise one or more of the following features and combinations thereof.

A fan case assembly may be adapted for use with a gas turbine engine. The fan case assembly may include a case, a plurality of vanes, and an inlet distortion mitigation system.

In some embodiments, the case may extend circumferentially at least partway about an axis to define an outer boundary of a gas path of the gas turbine engine. The case may be formed to define a plenum that that extends circumferentially at least partway about the axis. The plenum may be in fluid communication with the gas path of the gas turbine engine.

In some embodiments, the plurality of vanes may be arranged in the plenum. The plurality of vanes may be spaced apart circumferentially about the axis to define a plurality of inlet openings in fluid communication with the plenum.

In some embodiments, the inlet distortion mitigation system may include a movable closure mounted for movement relative to the fan case and a control unit. The movable closure may be configured to axially translate relative to the case to move between a slot position and a plenum position. In the slot position, the movable closure may divide the plenum into a plurality of slots to block circumferential flow through the plenum. In the plenum position, the movable closure may be spaced apart from the plenum to allow circumferential flow through the plenum.

In some embodiments, the control unit may be configured to move the movable closure between the slot position and the plenum position. The control unit may be configured to move the movable closure between the slot position and the plenum position in response to preselected operating conditions to minimize negative effects of pressure and swirl distortions in the gas turbine engine to improve stall margin for the gas turbine engine.

In some embodiments, the movable closure may be shaped to define a plurality of cutouts. Each cutout of the plurality of cutouts may be axially aligned with the plenum to allow circumferential flow through the plenum when the movable closure is in the plenum position.

In some embodiments, the movable closure may include a band and a plurality of flanges. The band may extend circumferentially at least partway about the axis. The plurality of flanges may be spaced apart circumferentially about the axis. Each flange of the plurality of flanges may extend axially from the band radially outward of the plurality of vanes. Each flange of the plurality of flanges may be shaped to include one cutout of the plurality of cutouts.

In some embodiments, the case may be formed into include a plurality of pockets. The plurality of pockets may extend axially into the case radially outward of the plurality of vanes. Each pocket of the plurality of pockets may be circumferentially aligned with one vane of the plurality of vanes. In some embodiments, each cutout of the plurality of cutouts may have a cross-sectional shape that matches a cross-sectional shape of a portion of the plenum when viewed in the circumferential direction.

In some embodiments, the movable closure may include a band and a plurality of flanges. The band may extend circumferentially at least partway about the axis. The plurality of flanges may spaced apart circumferentially about the axis and each extend axially from the band radially outward of the plurality of vanes. The plurality of flanges may extend into the plenum to block circumferential flow through the plenum when the movable closure is in the slot position.

In some embodiments, the control unit may include at least one actuator and a controller. The actuator may be coupled to the movable closure and configured to drive axial translation of the movable closure. The controller may be coupled to the at least one actuator. The controller may be configured to direct the at least one actuator to axially translate the movable closure to the slot position when the gas turbine engine is in a cruise condition included in the preselected operating conditions.

In some embodiments, the control unit may further include a memory. The memory may be coupled to the controller. The memory may include a plurality of preprogrammed aircraft maneuvers that each correspond to one of the slot position and the plenum position.

In some embodiments, the controller may be configured to detect a preprogrammed aircraft maneuver included in the plurality of preprogrammed aircraft maneuvers on the memory. The controller may be configured to direct the at least one actuator to move the movable closure to a corresponding position in response to detecting the preprogrammed aircraft maneuver.

In some embodiments, the control unit may further include at least one sensor. The sensor may be coupled to the controller and configured to measure one of pressure, air speed, altitude, blade tip timing, blade rotational speed, attitude, and acceleration.

In some embodiments, the controller may be configured to receive a measurement from the at least one sensor. The controller may be configured to direct the at least one actuator to move the movable closure to a corresponding position in response to the measurement of the at least one sensor.

According to another aspect of the present disclosure, a gas turbine engine may include a fan and a fan case assembly. The fan may include a fan rotor and a plurality of fan blades. The fan rotor may be configured to rotate about an axis of the gas turbine engine. The plurality of fan blades may be coupled to the fan rotor for rotation therewith.

In some embodiments, the fan case assembly may extend circumferentially around the plurality of fan blades radially outward of the plurality of fan blades. The fan case assembly may include a case, a plurality of vanes, and an inlet distortion mitigation system.

In some embodiments, the case may extend circumferentially at least partway about the axis. The case may be formed to define a plenum that that extends circumferentially at least partway about the axis. The plenum may be in fluid communication with the gas path of the gas turbine engine.

In some embodiments, the plurality of vanes may be arranged in the plenum. The plurality of vanes may be spaced apart circumferentially about the axis to define a plurality of inlet openings in fluid communication with the plenum.

In some embodiments, the inlet distortion mitigation system may include a movable closure mounted for movement relative to the fan case and a control unit. The movable closure may be configured to axially translate relative to the fan case to move between a slot position and a plenum position. The slot position, the movable closure may divide the plenum into a plurality of slots. The plenum position, the movable closure may be spaced apart from the plenum.

In some embodiments, the control unit may be configured to move the movable closure between the slot position and the plenum position. The control unit may be configured to move the movable closure between the slot position and the plenum position in response to preselected operating conditions to minimize pressure and swirl distortions in the gas turbine engine while providing additional stall margin.

In some embodiments, the movable closure may be shaped to define a plurality of cutouts. Each cutout of the plurality of cutouts may be axially aligned with the plenum to allow circumferential flow through the plenum when the movable closure is in the plenum position.

In some embodiments, the movable closure may include a band and a plurality of flanges. The band may extend circumferentially at least partway about the axis. The plurality of flanges may be spaced apart circumferentially about the axis. Each flange of the plurality of flanges may extend axially from the band radially outward the plurality of vanes. Each flange of the plurality of flanges may be shaped to include one cutout of the plurality of cutouts.

In some embodiments, the case may be formed into include a plurality of pockets. The plurality of pockets may extend axially into the case radially outward of the plurality of vanes. Each pocket of the plurality of pockets may be circumferentially aligned with one vane of the plurality of vanes.

In some embodiments, the movable closure may include a band and a plurality of flanges. The band may extend circumferentially at least partway about the axis. The plurality of flanges may be spaced apart circumferentially about the axis and each extend axially from the band radially outward of the plurality of vanes. The plurality of flanges may extend into the plenum to block circumferential flow through the plenum when the movable closure is in the slot position.

In some embodiments, the control unit may include at least one actuator and a controller. The actuator may be coupled to the movable closure. The actuator may be configured to drive axial translation of the movable closure. The controller may be coupled to the at least one actuator. The controller may be configured to direct the at least one actuator to axially translate the movable closure to the slot position when the gas turbine engine is in a cruise condition included in the preselected operating conditions.

In some embodiments, the control unit may further include a memory. The memory may be coupled to the controller.

In some embodiments, the memory may include a plurality of preprogrammed aircraft maneuvers that each correspond to one of the slot position and the plenum position. The controller may be configured to detect a preprogrammed aircraft maneuver included in the plurality of preprogrammed aircraft maneuvers on the memory. The controller may direct the at least one actuator to move the movable closure to a corresponding position in response to detecting the preprogrammed aircraft maneuver.

In some embodiments, the control unit may further include at least one sensor. The sensor may be coupled to the controller and configured to measure one of pressure, air speed, altitude, blade tip timing, blade rotational speed, attitude, and acceleration.

In some embodiments, the controller may be configured to receive a measurement from the at least one sensor. The controller may direct the at least one actuator to move the movable closure to a corresponding position in response to the measurement of the at least one sensor.

According to another aspect of the present disclosure, a method may include providing a fan case assembly adapted for use with a gas turbine engine. The fan case assembly may include a case, a plurality of vanes, and an inlet distortion system.

In some embodiments, the case may extend circumferentially at least partway about an axis of the gas turbine engine and is formed to define a plenum that that extends circumferentially at least partway about the axis. The plurality of vanes may be arranged in the plenum and spaced apart circumferentially about the axis to define a plurality of inlet openings in fluid communication with the plenum. The inlet distortion mitigation system may include a movable closure mounted for axial translation relative to the case.

In some embodiments, the method may further include locating the movable closure in a slot position. In the slot position, the movable closure may divide the plenum into a plurality of slots to block circumferential flow through the plenum.

In some embodiments, the method may further include translating the movable closure from the slot position to a plenum position. In the plenum position, the movable closure may be spaced apart from the plenum to allow circumferential flow through the plenum in response to one preselected operating condition included in a plurality of preselected operating conditions.

These and other features of the present disclosure will become more apparent from the following description of the illustrative embodiments.

DETAILED DESCRIPTION OF THE DRAWINGS

Figure 1:
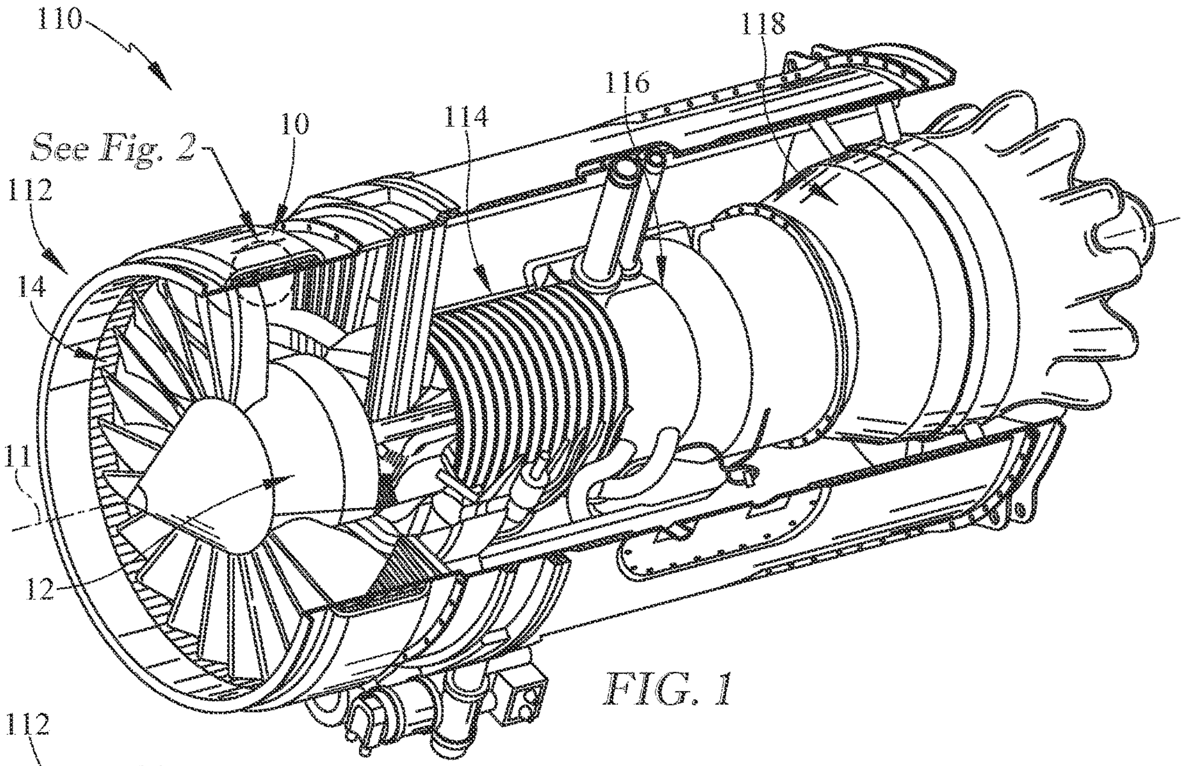
FIG. 1 is a cutaway view of a gas turbine engine that includes a fan, a compressor, a combustor, and a turbine, the fan including fan rotor configured to rotate about an axis of the engine and a fan case assembly that surrounds fan blades included in the fan rotor.

For the purposes of promoting an understanding of the principles of the disclosure, reference will now be made to a number of illustrative embodiments illustrated in the drawings and specific language will be used to describe the same.

A fan case assembly 10 is adapted for use in a gas turbine engine 110 as shown in FIG. 1. The gas turbine engine 110 includes a fan 112, a compressor 114, a combustor 116, and a turbine 118 as shown in FIG. 1. The fan 112 is driven by the turbine 118 and provides thrust for propelling an aircraft. The compressor 114 compresses and delivers air to the combustor 116. The combustor 116 mixes fuel with the compressed air received from the compressor 114 and ignites the fuel. The hot, high pressure products of the combustion reaction in the combustor 116 are directed into the turbine 118 to cause the turbine 118 to rotate about an axis 11 of the gas turbine engine 110 and drive the compressor 114 and the fan 112.

The fan 112 includes a fan rotor 12 and a fan case assembly 10 as shown in FIG. 1. The fan rotor 12 has a number of fan blades 14. The fan case assembly 10 extends circumferentially around the fan blades 14 of the fan rotor 12 such that the fan case assembly 10 is aligned axially with the fan blades 14.

Figure 2:
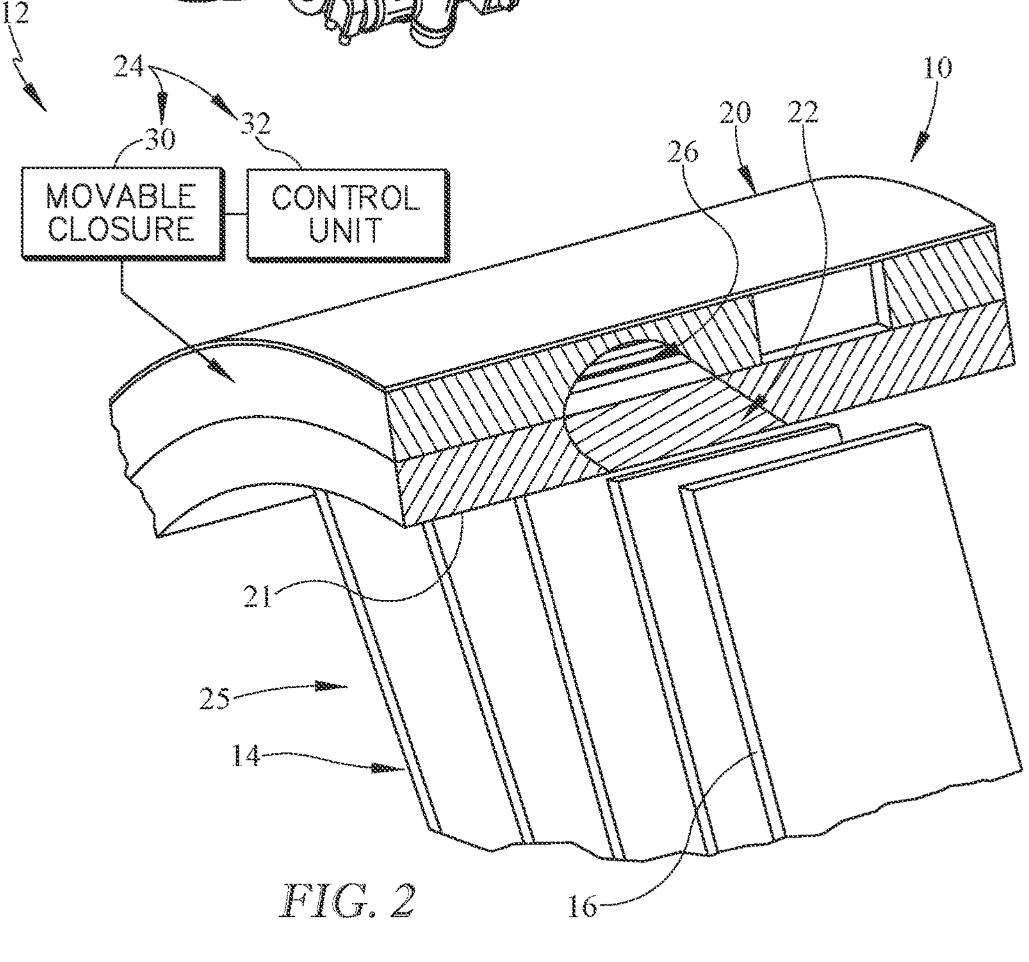
FIG. 2 is a detail view of the fan case assembly included in the gas turbine engine of FIG. 1 showing that the fan case assembly includes a case that extends circumferentially at least partway about an axis of the engine radially outward of the fan blades to define an outer boundary of a gas path of the gas turbine engine, a plurality of a plurality of vanes arranged in a plenum defined by the case to form a plurality of inlet openings in fluid communication with the plenum, and an inlet distortion mitigation system that includes a movable closure mounted for axial movement relative to the case between a slot position as shown in FIG. 5A and a plenum position as shown in FIG. 6A and a control unit configured to move the movable closure between the different positions in response to preselected operating conditions to control fluid communication between the plenum and the gas path so as to minimize the negative effects of pressure and swirl distortions in the gas turbine engine to improve stall margin.
Figure 3:
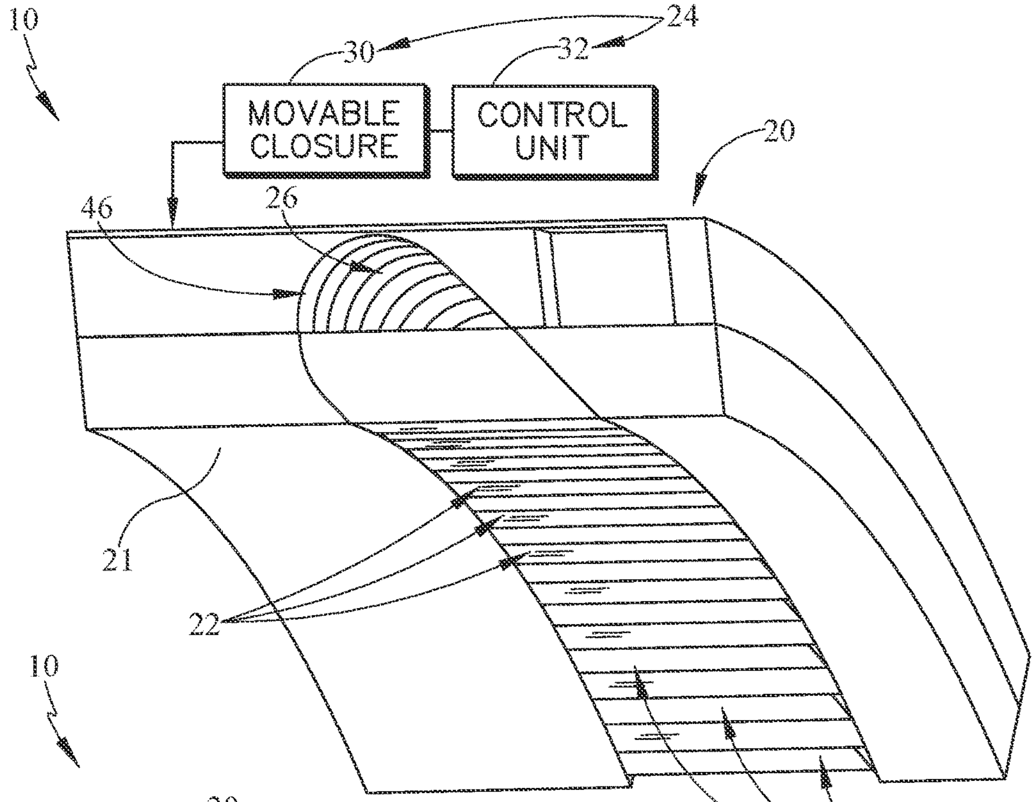
FIG. 3 is a perspective view of the fan case assembly of FIG. 2 showing the movable closure includes a plurality of cutouts configured to be aligned with the plenum when the movable closure is in the plenum position.
Figure 4:
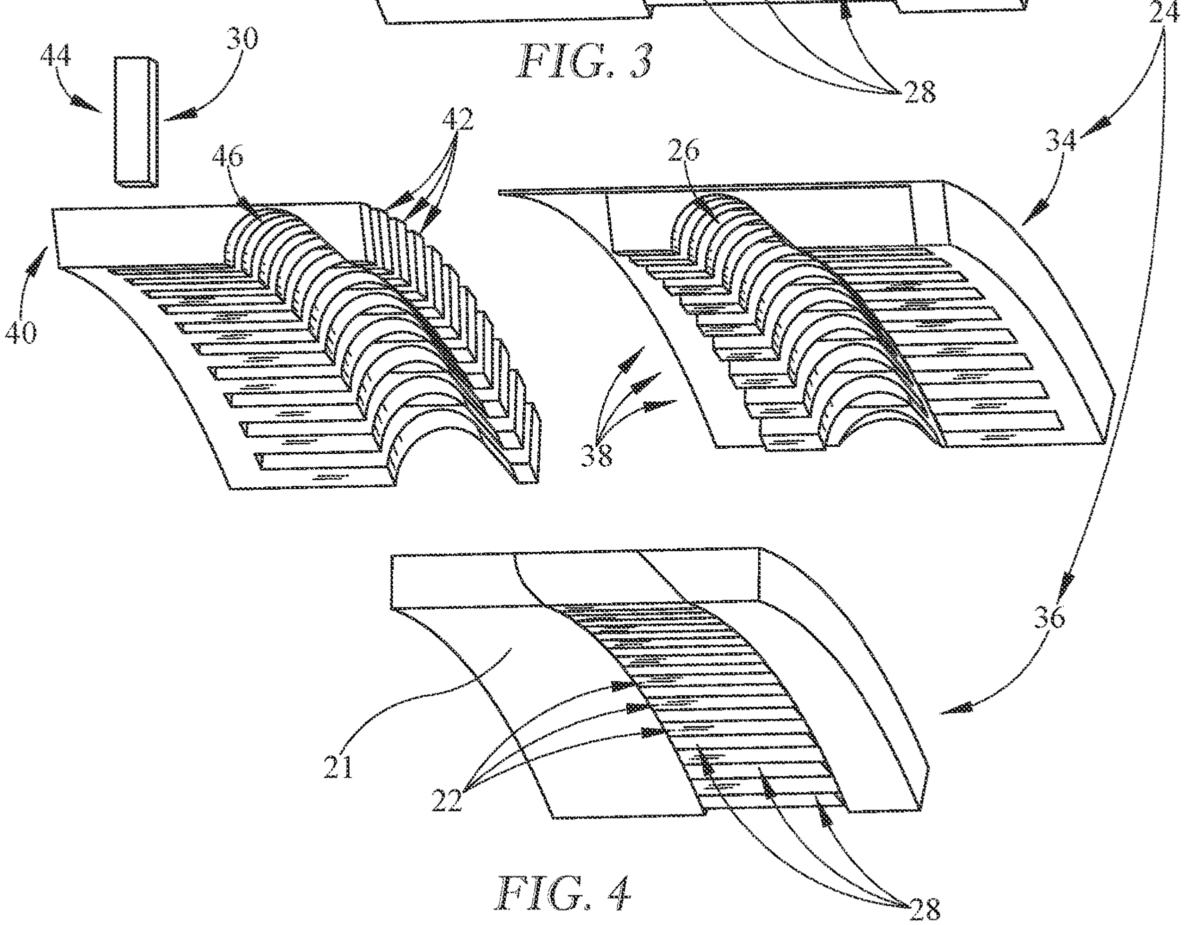
FIG. 4 is an exploded view of the fan case assembly of FIG. 3 showing the movable closure includes a band that extends circumferentially at least partway about the axis and a plurality of flanges spaced apart circumferentially about the axis that each extend axially from the band, and further showing the case is formed into include a plurality of pockets that extend axially into the case to receive the plurality of flanges included in the movable closure as the movable closure translates axially relative to the case.

The fan case assembly 10 includes, among other components, a case 20, a plurality of vanes 22, and an inlet distortion mitigation system 24 as shown in FIGS. 2-4. The case 20 extends circumferentially at least partway about the axis 11 to define an outer boundary of a gas path 25 of the gas turbine engine 110. The case 20 is formed to define a plenum 26 that extends circumferentially at least partway about the axis 11 and is open to the gas path 25 of the gas turbine engine 110. The plurality of vanes 22 are arranged in the plenum 26. The plurality of vanes 22 are spaced apart circumferentially about the axis 11 to define a plurality of inlet openings 28 in fluid communication with the plenum 26. The inlet distortion mitigation system 24 is configured to control fluid communication between the plenum 26 and the gas path 25 of the gas turbine engine 110.

Figure 5A:
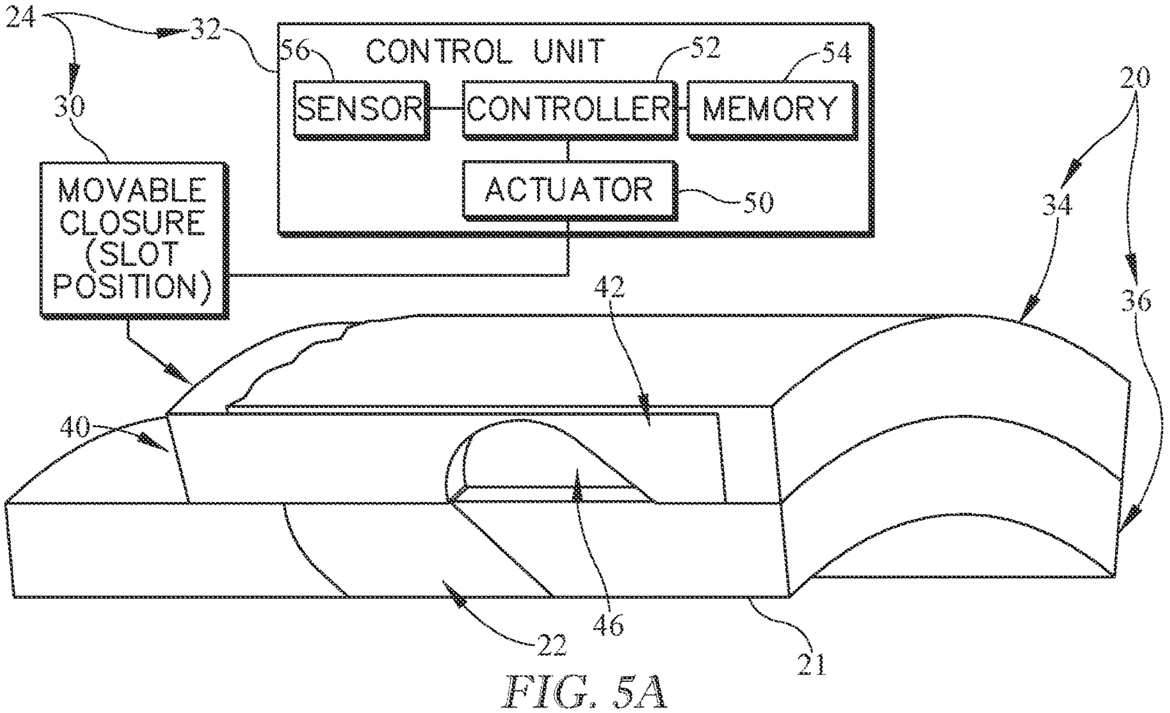
FIG. 5A is a perspective view of the fan case assembly of FIG. 3 with the movable closure in the slot position in which the plurality of flanges of the movable closure extend in to the plenum to divide the plenum into a plurality of slots thereby blocking circumferential flow through the plenum.
Figure 6A:
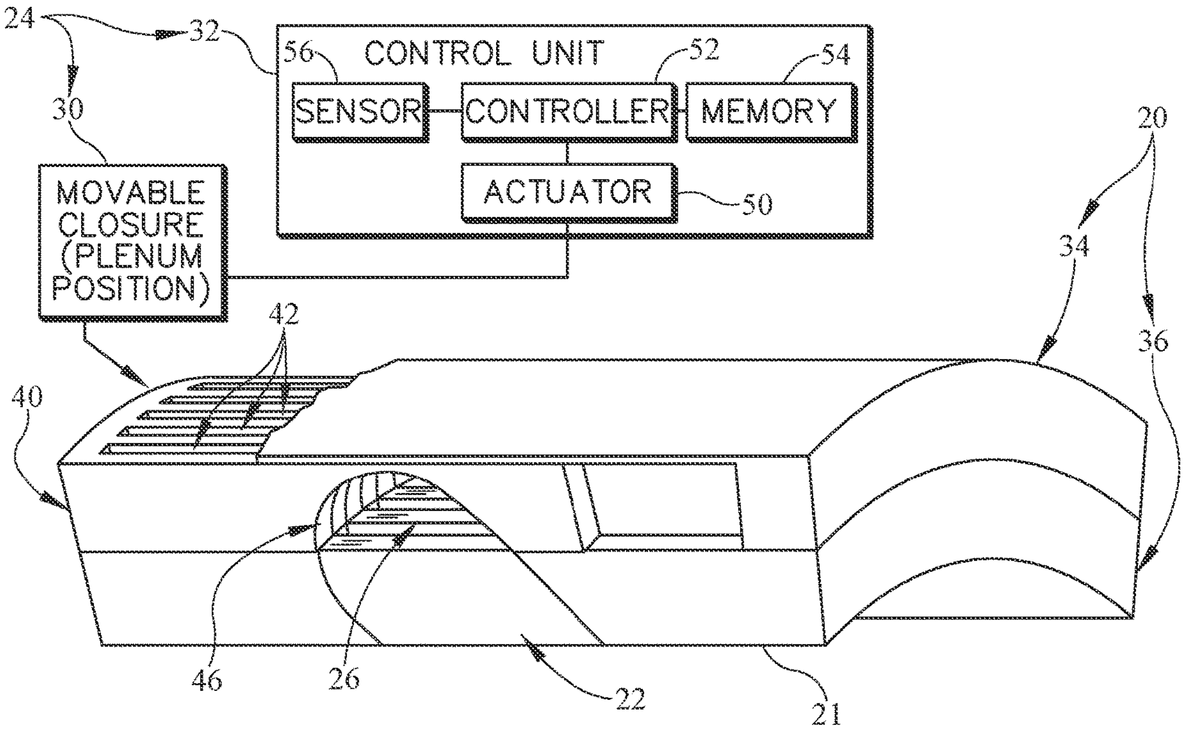
FIG. 6A is a perspective view of the fan case assembly of FIG. 3 with the movable closure in the plenum position in which the plurality of flanges of the movable closure are slide axially relative to the case so that the plurality of cutouts formed therein align with plenum to allow circumferential flow through the plenum.
Figure 5B:
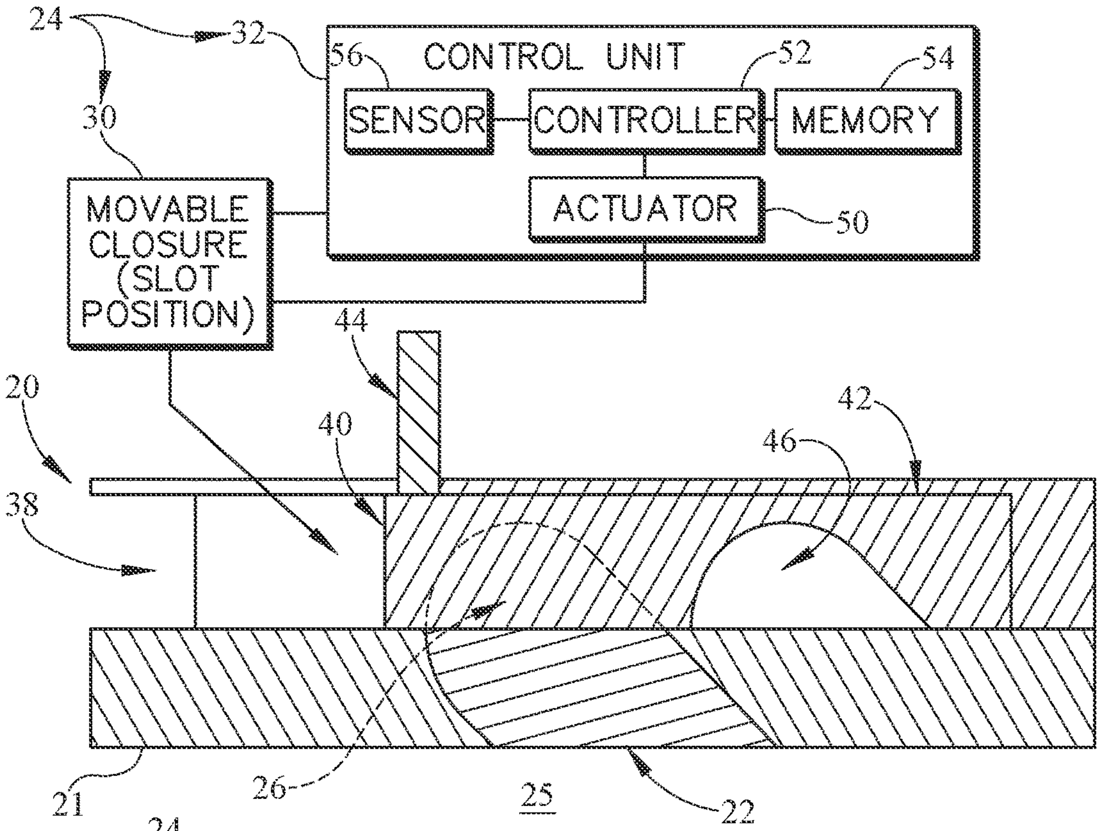
FIG. 5B is a cross-section view of the fan case assembly of FIG. 5A from outside the fan case assembly showing the movable closure in the slot position.
Figure 6B:
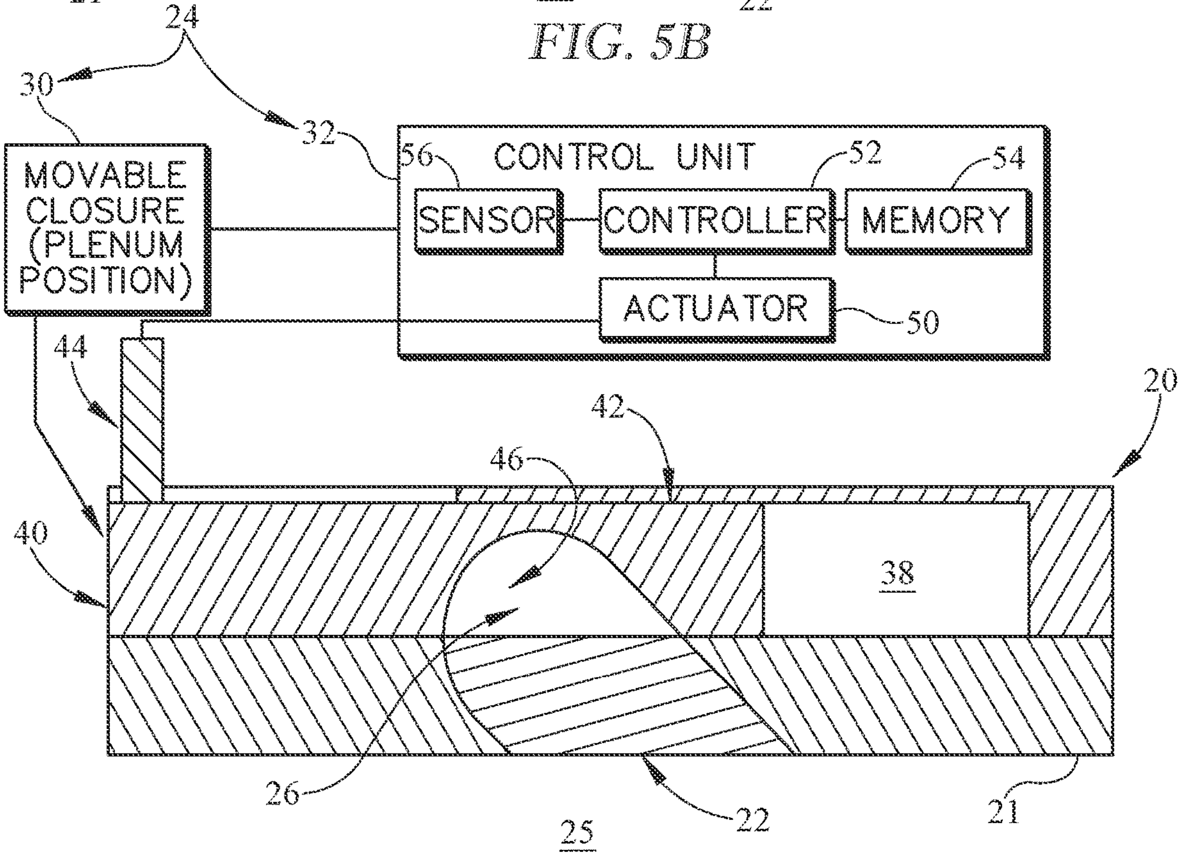
FIG. 6B is a cross-section view of the fan case assembly of FIG. 6A from outside the fan case assembly showing the movable closure in the plenum position.

The inlet distortion mitigation system 24 includes a movable closure 30 and a control unit 32 as shown in FIGS. 2-4. The movable closure 30 is mounted for axial movement relative to the case 20 between a slot position as shown in FIGS. 5A and 5B and a plenum position as shown in FIGS. 6A and 6B. The control unit 32 is configured to move the movable closure 30 between the different positions in response to preselected operating conditions to control circumferential flow through the plenum 26 so as to minimize the negative effects of pressure and swirl distortions in the gas turbine engine 110 to improve stall margin for the gas turbine engine 110.

Embedded engines on an aircraft may experience high distortion in the form of pressure gradients and swirl. The pressure and swirl distortions may cause engine stall or other undesirable aeromechanical behavior. Additionally, there may be points during a mission or moments with maneuvers where it may be desirable to incorporate a different available stall margin or to be able to more evenly distribute flows. Attempting to solve the worst stall condition while maintaining performance over all of the cycles or flight conditions may be difficult and result in compromised efficiency or a limited flight envelope.

Therefore, the fan case assembly 10 includes the inlet distortion mitigation system 24 which includes the movable closure 30 that axially translates relative to the case 20 to control circumferential flow through the plenum 26. In this way, the negatives effects of pressure and swirl distortions are minimized to improve stall margin. The negative effects may include loss of efficiency or overall performance of the engine 110 and/or other negative operating conditions known to one of ordinary skill in the art.

Figure 5C:
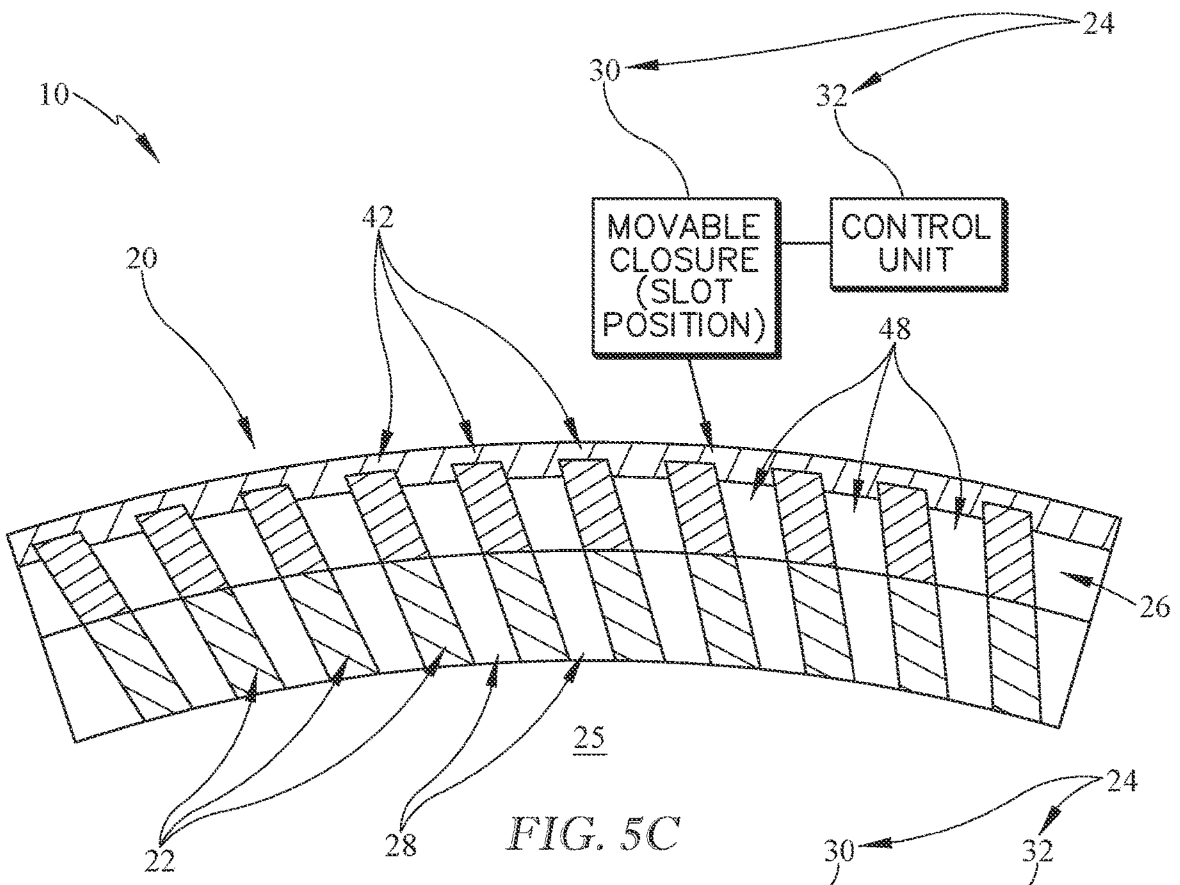
FIG. 5C is a cross-section view of the fan case assembly of FIG. 5A showing the plurality of flanges of the movable closure extend into the plenum to divide the plenum into the plurality of slots while blocking circumferential flow through the plenum when the movable closure is in the slot position.

In the slot position, the movable closure 30 extends into the plenum 26 and divides the plenum 26 into a plurality of slots 48 as shown in FIG. 5C. The movable closure 30 extends into the plenum 26 and divides the plenum 26 into the plurality of slots 48 to block circumferential flow through the plenum 26 as shown in FIGS. 5A-C.

In the plenum position, the movable closure 30 is spaced apart from the plenum 26 by aligning a plurality of cutouts 46 formed in the movable closure 30 with the plenum 26 to allow circumferential flow through the plenum. This permits air pressure and flows to better equalize circumferentially to improve stall margin.

The control unit 32 is configured to move the movable closure 30 between the different positions in response to preselected operating conditions. The preselected operating conditions include a plurality of preprogrammed aircraft maneuvers stored on a memory 54 included in the control unit 32. The plurality of preprogrammed aircraft maneuvers include banks, turns, rolls, etc.

The control unit 32 is configured to detect a preprogrammed aircraft maneuver included in the plurality of preprogrammed aircraft maneuvers on the memory 54. Once the preprogrammed aircraft maneuver is detected, the control unit 32 directs the movable closure to move to a corresponding position in response to detecting the preprogrammed aircraft maneuver.

For example, the movable closure 30 may normally be in the slot position during a cruise condition so that no additional stall margin is created, but performance is not compromised. The cruise condition included in the preselected operating conditions corresponds when the aircraft is in the cruise portion of the flight cycle.

Then, when the control unit 32 detects a preprogrammed aircraft maneuver, i.e. banks, turns, rolls, the control unit 32 directs the movable closure 30 to axially translate to the plenum position so that circumferential flow is permitted into the plenum 26. This permits air pressure and flows to better equalize circumferentially around the fan 112 thereby minimizing the negative effects of pressure and swirl distortions to improve stall margin.

Conversely, when the control unit 32 detects the cruise condition after a preprogrammed aircraft maneuver, the control unit 32 directs the movable closure 30 to move to the slot position. Therefore, once the aircraft maneuver is completed, the movable closure 30 moves to the slot position so that performance is not compromised and the additional stall margin is removed during the cruise condition.

The preselected operating conditions may further include a sensor input from at least one sensor 56 included in the control unit 32. The sensor 56 is configured to measure one of pressure, air speed, altitude, blade tip timing, blade rotational speed, attitude or aircraft orientation, and acceleration. The sensor 56 is also configured to detect distortion, fan stall, and/or other aeromechanical issues. In some embodiments, the control unit 32 includes a plurality of sensors 56 each configured to measure one of pressure, air speed, and acceleration and/or detect distortion, fan stall, and/or other aeromechanical issues.

The sensor 56 may include one of or a combination of dynamic sensors, static wall pressure sensors, altitude sensors, sensors configured to detect the angle of attack of the plurality of fan blades 14, sensors configured to detect the tip timing of the plurality of fan blades 14, and air speed sensors. In some embodiments, the sensor 56 may be a dynamic pressure transducer. The sensor 56 may also be a sensor configured to measure a rotational speed of the fan blades 14, which could be used along with an additional sensor that is a dynamic pressure transducer. In some embodiments, the sensor 56 may be a sensor configured to measure a rotation speed of another section of the engine 110.

The preselected operating conditions may further include a sensor input from the sensor 56 or sensors 56 included in the control unit 32. The sensor 56 is configured to measure one of pressure, air speed, altitude, blade tip timing, blade rotational speed, attitude, and acceleration.

The control unit 32 is configured to receive a measurement from the at least one sensor 56 or sensors 56 and direct the movable closure 30 to move to a corresponding position in response to the measurement of the at least one sensor 56. The control unit 32 may be configured to direct the movable closure 30 to be in the slot position when the measurements from the sensor 56 are within a predetermined threshold. Then, when the measurement from the sensor 56 is outside of the predetermined threshold, the control unit 32 directs the movable closure 30 to move to the plenum position.

In some embodiments, the control unit 32 may be configured to use a combination of the sensor measurements and the detected preprogrammed aircraft maneuver to control the position of the movable closure 30. For example, when the control unit 32 detects a preprogrammed aircraft maneuver and the measurement is outside of the predetermined threshold, the control unit 32 directs the movable closure 30 to axially translate to the plenum position.

In some embodiments, the control unit 32 is configured to use the measurements from the sensor 56 to anticipate the aircraft maneuver. The control unit 32 is configured to direct the movable closure 30 to the plenum position in response to the measurement from the sensor 56 even though no preprogrammed aircraft maneuver is detected.

Alternatively, there may be a delay in the measurements from the sensor 56. Therefore, the control unit 32 is also configured to direct the movable closure 30 to move to the plenum position when the one of the preprogrammed aircraft maneuvers is detected, even though the measurements from the sensor 56 are within the predetermined thresholds.

In some embodiments, the control unit 32 may detect one of the preprogrammed aircraft maneuvers, but the measurements from the sensors 56 are within the predetermined threshold. If so, the control unit 32 may direct the movable closure 30 to remain in the current position.

The movable closure 30 includes a band 40 and a plurality of flanges 42 as shown in FIGS. 2-4. The band 40 extends circumferentially at least partway about the axis 11. The plurality of flanges 42 are spaced apart circumferentially about the axis 11. Each flange 42 extends extend axially from the band 40 radially outward of the vanes 22 in line with the plurality of vanes 22. In other words, each plurality of flanges 42 are circumferentially aligned with one of the vanes 22 included in the plurality of vanes 22. The plurality of flanges 42 are located radially outward of the vanes 22 as shown in FIGS. 2-4.

Each flange 42 of the plurality of flanges 42 is shaped to include one cutout 46 of the plurality of cutouts 46 as shown in FIGS. 2-4. Each cutout 46 extends circumferentially through the associated flange 42. In the illustrative embodiment, each cutout 46 of the plurality of cutouts 46 has a cross-sectional shape that matches a cross-sectional shape of a portion of the plenum 26 when viewed in the circumferential direction as shown in FIGS. 2-4.

Turning again to the fan case assembly 10, the fan case assembly 10 extends circumferentially at least partway about the axis 11 in the illustrative embodiment. In some embodiments, the fan 112 may include multiple fan case assemblies 10 arranged circumferentially about the axis 11 to form a full hoop. In other embodiments, the fan case assembly 10 may be annular and extends circumferentially about the axis 11. In some embodiments, the case 20 may extend around the axis 11, while the plenum 26 only extends partway about the axis 11.

In some embodiments, the fan 112 may include multiple fan case assemblies 10 spaced apart circumferentially about the axis 11 to define segments between each fan case assembly 10. The segments between the fan case assemblies 10 does not have a plenum 26 so that the plenums 26 of each of the fan case assemblies 10 are independent from each other.

The case 20 includes an outer section 34 and an inner section 36 as shown in FIG. 4. The outer section 34 is coupled to the inner section 36 to form the case 20.

The outer section 34 is formed to define an outer portion 26A of the plenum 26, while the inner section 36 is formed to define an inner portion 26B of the plenum 26. The plurality of vanes 22 are arranged in the inner portion 26B of the plenum 26 as shown in FIG. 4.

The plenum 26 is formed in the case 20 so that the plenum 26 is located at a leading edge 16 of each of the fan blades 14 as shown in FIG. 2. In the illustrative embodiment, the plenum 26 has a forward leaning cross-sectional shape as shown in FIGS. 2 and 3. In some embodiments, the plenum 26 may have another cross-sectional shape.

The outer section 34 of the case 20 further includes a plurality of pockets 38 as shown in FIG. 4. The plurality of pockets 38 each extend axially through the case 20 radially outward of the vanes 22 in line with each of the vanes 22 included in the plurality of vanes 22 as shown in FIG. 4. Each flange 42 is located in one of the pockets 38 and slides within the corresponding pocket 38 as the movable closure 30 axially translates relative to the case 20.

Each of the vanes 22 extends axially across the plenum 26 as shown in FIGS. 2-4. In the illustrative embodiment, the vanes 22 are tilted circumferentially relative to the axis 11 as shown in FIGS. 5C and 6C.

The inlet distortion mitigation system 24 includes the movable closure 30 and the control unit 32 as shown in FIGS. 2-4. The control unit 32 is coupled to the movable closure 30 to control axial translation thereof.

The movable closure 30 includes the band 40 that extends circumferentially at least partway about the axis 11 and the plurality of flanges 42 that each extend axially from the band 40 radially outward of the vanes 22 included in the plurality of vanes 22. The band 40 links movement of the plurality of flanges 42 together so that when the control unit 32 moves the band 40, the plurality of flanges 42 axially translate together to the desired position.

Figure 6C:
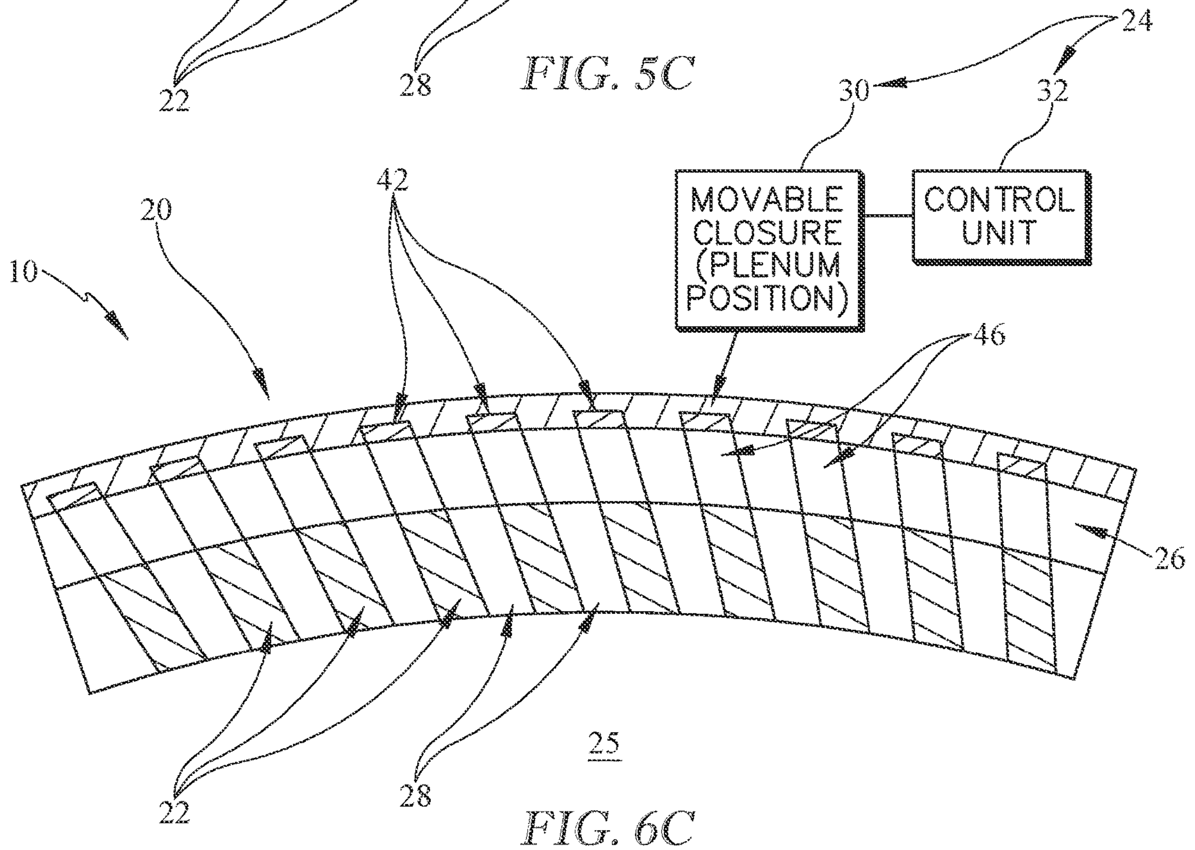
FIG. 6C is a cross-section view of the fan case assembly of FIG. 6A showing the cutouts in each of the plurality of flanges of the movable closure are aligned with the plenum to allow circumferential flow through the plenum when the movable closure is in the plenum position.
Figure 7:
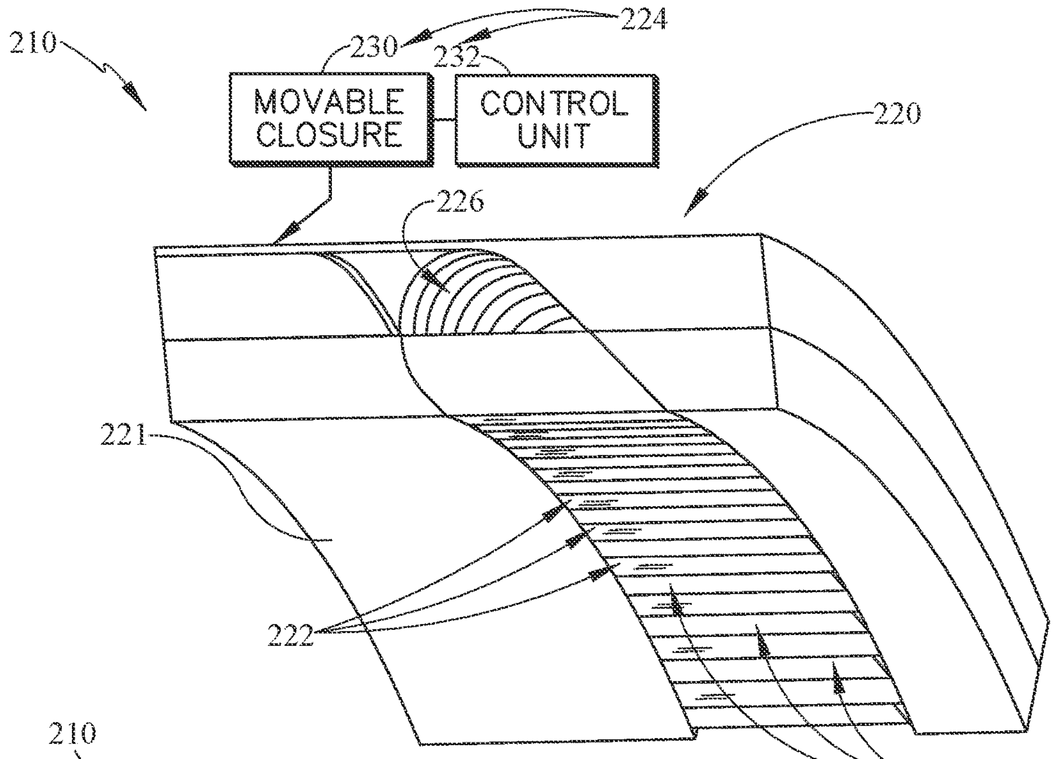
FIG. 7 is a perspective view of another embodiment of a fan case assembly included in the gas turbine engine of FIG. 1 showing the fan case assembly includes a case that defines a plenum, a plurality of a plurality of vanes arranged in the plenum to form a plurality of inlet openings in fluid communication with the plenum, and an inlet distortion mitigation system that includes a movable closure mounted for axial movement relative to the case between a slot position as shown in FIG. 9 and a plenum position as shown in FIG. 10 to control fluid communication between the plenum and the gas path of the gas turbine engine, and further showing the movable closure

Because the vanes 22 are tilted circumferentially relative to the axis 11, the flanges 42 are each tilted circumferentially as shown in FIGS. 5C and 6C. The slots 48 formed between each vane 22 and flange 42 when the movable closure 30 is in the slot position also extend radially and circumferentially to match the tilt of each vane 22 and each flange 42.

In the illustrative embodiment, the movable closure 30 further includes a rod 44 as shown in FIGS. 4, 5B, and 6B. The rod 44 is coupled to the band 40 and extends radially outward through the case 20 to be coupled an actuator 50 included in the control unit 32.

In some embodiments, the movable closure 30 may include a rack and pinion assembly to drive axial translation of the plurality of flanges 42. Instead of extending through the case 20, the rod 42 may be contained in the case and function as a rack with teeth that mate with a corresponding gear. The gear may be coupled to the actuator 50 of the control unit 32 to drive rotation of the gear which in turn drives axial translation of the plurality of flanges 42.

In some embodiments, another suitable actuation assembly may be used. For example, the movable closure 30 may include an actuation system similar to those used to control variable vanes. The movable closure 30 may include another suitable mechanical drive mechanism or linkage coupled to the band 40 to drive rotation of the band 40 about the axis 11.

Each flange 42 of the plurality of flanges 42 is shaped to include one cutout 46 of the plurality of cutouts 46 as shown in FIGS. 2-4. Each cutout 46 extends circumferentially through the associated flange 42.

The control unit 32 includes at least one actuator 50, a controller 52, a memory 54, and at least one sensor 56 as shown in FIGS. 2-4. The actuator 50 is coupled to the band 40 of the movable closure 30. The actuator 50 is configured to drive axial translation of the movable closure 30. The controller 52 is coupled to the actuator 50 to direct the actuator 50 to axially translate the movable closure 30 between the different positions. The memory 54 stores the preprogrammed aircraft maneuvers and the predetermined thresholds. The memory 54 may also include another suitable lookup table on the system of the aircraft to direct the movement of the movable closure 30.

In the illustrative embodiment, the control unit 32 includes at least one actuator 50. In the illustrative embodiment, the actuator 50 is a linear actuator. In some embodiments, the actuator 50 may include pneumatic or electric actuators, or combinations of hydraulic, pneumatic, and electric. Any other actuator known to a person skilled in the art could be utilized as well. The actuator 50 is configured to drive axial translation of the movable closure 30 between the slot position as shown in FIGS. 5A-C and the plenum position as shown in FIGS. 6A-C In the illustrative embodiment, the control unit 32 includes a single actuator 50 coupled to the rod 44 to drive axial translation of the plurality of flanges 42 together in unison. If the fan 112 includes multiple fan case assemblies 10 spaced apart around the axis 11, the control unit 32 may include multiple actuators 50 to control axial translation of each movable closure 30. Each actuator 50 may be coupled to the rod 44 included in the respective movable closure 30.

In some embodiments, the movable closure 30 may not include the band 40 or the rod 44. Instead, the control unit 32 includes a plurality of actuators 50 each coupled to a respective flange 42 to control the position of each flange 42 individually. In some embodiments, the movable closure 30 may include a rod 44 for each respective flange 42 and the control unit 32 may include a plurality of actuators 50 each coupled to one of the respective rods 44.

The controller 52 is configured to direct the actuator 50 to move the movable closure 30 between the different positions in response to preselected operating conditions. The preselected operating conditions include the plurality of preprogrammed aircraft maneuvers stored on the memory 54 included in the control unit 32.

The controller 52 of the control unit 32 is configured to detect a preprogrammed aircraft maneuver included in the plurality of preprogrammed aircraft maneuvers on the memory 54. Once the preprogrammed aircraft maneuver is detected, the controller 52 directs the actuator 50 to drive axial translation of the movable closure 30 to a corresponding position in response to detecting the preprogrammed aircraft maneuver.

If the movable closure 30 does not include a band 40, the controller 52 may be configured to direct the separate actuators 50 to drive axial translation of the movable closure 30 to a corresponding position in response to detecting the preprogrammed aircraft maneuver. The controller 52 may direct some or all of the actuators 50 to drive axial translation of certain flanges 42 in response to detecting the preprogrammed aircraft maneuver. Therefore, some of the flanges 42 of the movable closure 30 may be in the slot position, while others are in the plenum position in which circumferential flow is permitted partway about the axis 11.

The preselected operating conditions may further include a sensor input from at least one sensor 56 included in the control unit 32. The sensor 56 is configured to measure one of pressure, air speed, and acceleration. The sensor 56 is also configured to detect distortion, fan stall, and/or other aeromechanical issues. In some embodiments, the control unit 32 includes a plurality of sensors 56 each configured to measure one of pressure, air speed, and acceleration and/or detect distortion, fan stall, and/or other aeromechanical issues.

The sensor 56 may include one of or a combination of dynamic sensors, static wall pressure sensors, altitude sensors, sensors configured to detect the angle of attack of the plurality of fan blades 14, sensors configured to detect the tip timing of the plurality of fan blades 14, and air speed sensors. In some embodiments, the sensor 56 may be a dynamic pressure transducer. The sensor 56 may also be a sensor configured to measure a rotational speed of the fan blades 14, which could be used along with an additional sensor that is a dynamic pressure transducer. In some embodiments, the sensor 56 may be a sensor configured to measure a rotation speed of another section of the engine 110.

The controller 52 of the control unit 32 is configured to receive a measurement from the sensor 56 or sensors 56 and direct the actuator 50 to move the movable closure 30 to a corresponding position in response to the measurement of the at least one sensor 56. The controller 52 of the control unit 32 may be configured to direct actuator 50 to move the movable closure 30 to the slot position when the measurements from the sensor 56 are within a predetermined threshold.

Then, when the measurement from the sensor 56 is outside of the predetermined threshold, the controller 52 directs the actuator 50 to move the movable closure 30 to the plenum position. Based on the difference of the measurement from the sensor 56 compared to the predetermined threshold, the controller 52 may change the position of the movable closure 30 to control circumferential flow through the plenum 26.

In some embodiments, the controller 52 of the control unit 32 may be configured to use a combination of the sensor measurements and the detected preprogrammed aircraft maneuver to control the position of the movable closure 30. For example, when the controller 52 of the control unit 32 detects a preprogrammed aircraft maneuver and the measurement is outside of the predetermined threshold, the controller 52 directs the actuator 50 to axially translate the movable closure 30 to the plenum position.

In some embodiments, the controller 52 of the control unit 32 is configured to use the measurements from the sensor 56 to anticipate the aircraft maneuver. The controller 52 of the control unit 32 is configured to direct the actuator 50 to move the movable closure 30 to the plenum position in response to the measurement from the sensor 56 even though no preprogrammed aircraft maneuver is detected.

Alternatively, there may be a delay in the measurements from the sensor 56. Therefore, the controller 52 of the control unit 32 is also configured to direct the actuator 50 to move the movable closure 30 to the plenum position when the one of the preprogrammed aircraft maneuvers is detected, even though the measurements from the sensor 56 are within the predetermined thresholds.

In some embodiments, the controller 52 of the control unit 32 may detect one of the preprogrammed aircraft maneuvers, but the measurements from the sensors 56 are within the predetermined threshold. If so, the controller 52 of the control unit 32 may direct the movable closure 30 to remain in the current position.

A method of operating the inlet distortion mitigation system 24 may include several steps. During normal cruise conditions, the controller 52 directs the actuator 50 to locate the movable closure 30 in the slot position. If the controller 52 detects one of the preselected operating conditions other than the cruise condition, the controller 52 directs the actuator 50 to axially translate the movable closure 30 to on the plenum position depending on the operating condition detected to minimize the negative effects of pressure and swirl distortions to improve stall margin.

The method further includes continually adjusting the position of the movable closure 30 based on the preselected operating conditions of the engine 110. If the controller 52 detects the cruise condition, the controller 52 directs the actuator 50 to move the movable closure 30 back to the slot position. In other instances, the controller 52 may direct the actuator 50 to control the position of the movable closure 30 as discussed above based on the preprogrammed aircraft maneuvers and/or the measurements from the sensors.

Figure 8:
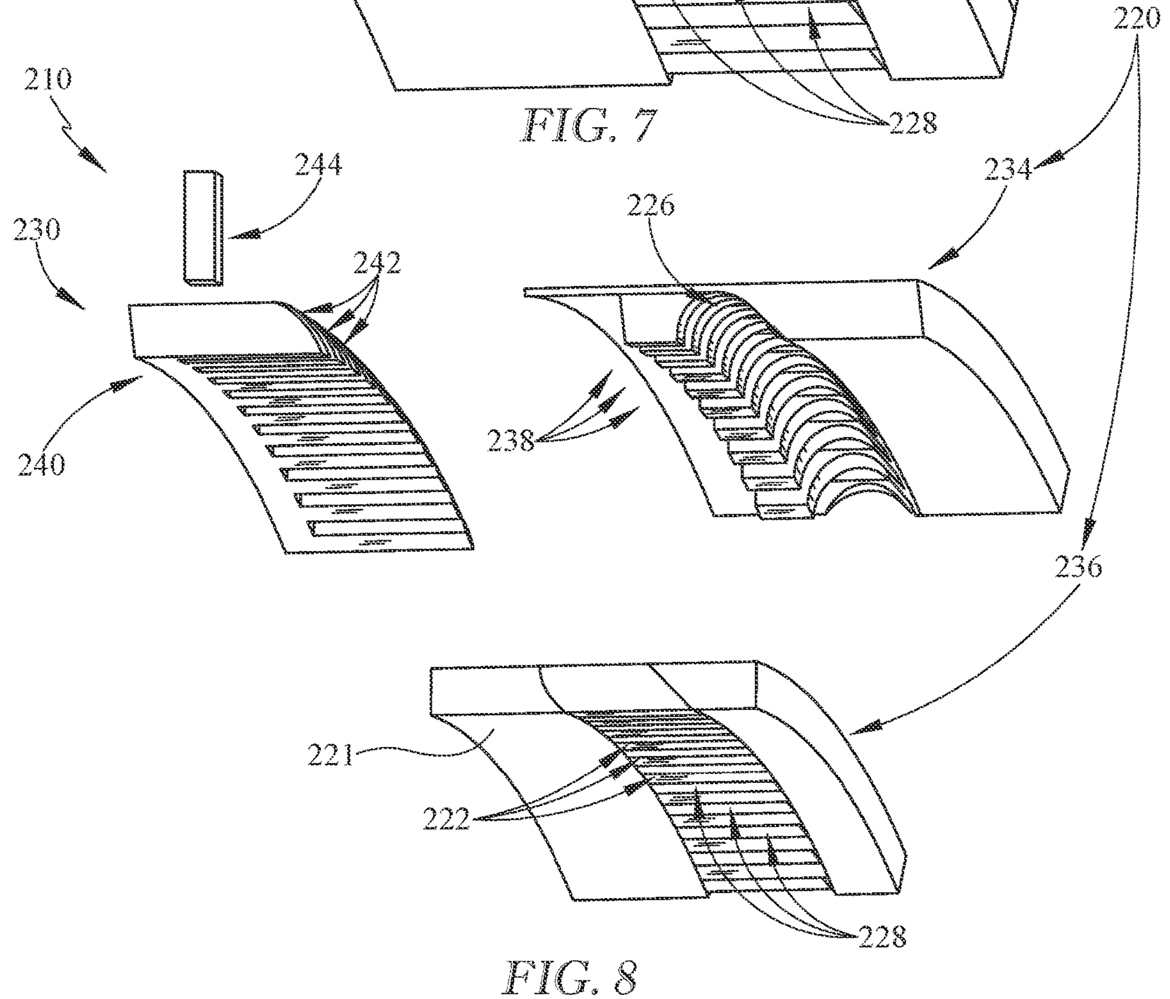
FIG. 8 is an exploded view of the fan case assembly of FIG. 7 showing the movable closure includes a band that extends circumferentially at least partway about the axis and a plurality of flanges spaced apart circumferentially about the axis that each extend axially from the band between adjacent vanes included in the plurality of vane, and further showing each of the flanges does not include a cutout.
Figure 9:
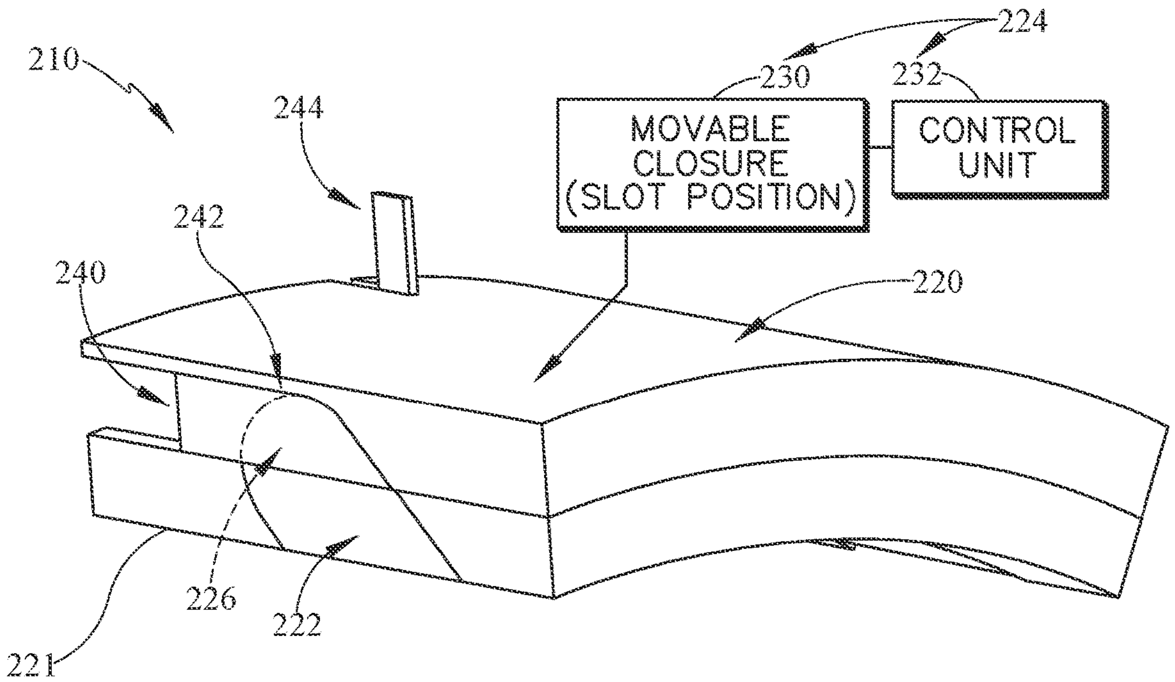
FIG. 9 is a perspective view of the fan case assembly of FIG. 7 with the movable closure in the slot position in which the plurality of flanges of the movable closure extend in to the plenum to divide the plenum into a plurality of slots thereby blocking circumferential flow through the plenum.
Figure 10:
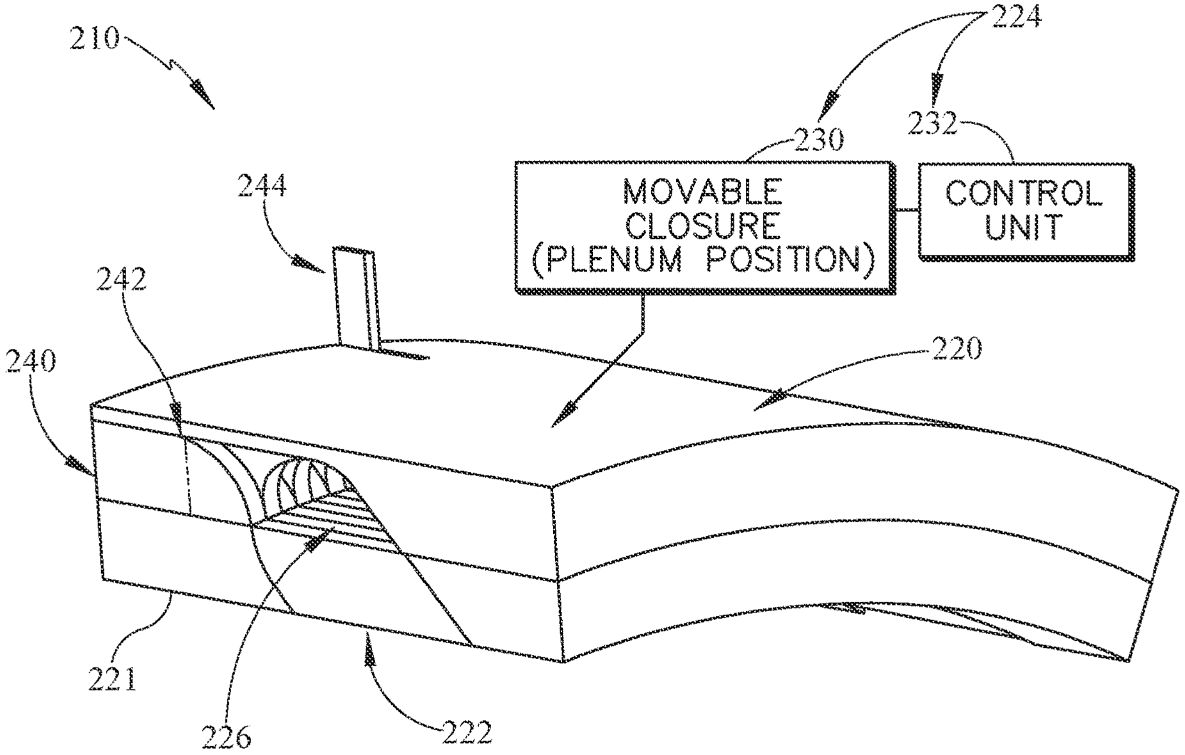
FIG. 10 is a perspective view of the fan case assembly of FIG. 7 with the movable closure in the plenum position in which the plurality of flanges of the movable closure are slide axially relative to the case so that each of the flanges is spaced apart axially from the plenum to allow circumferential flow through the plenum.

Another embodiment of a fan case assembly 210 in accordance with the present disclosure is shown in FIGS. 8-10. The fan case assembly 210 is substantially similar to the fan case assembly 10 shown in FIGS. 1-6B and described herein. Accordingly, similar reference numbers in the 200 series indicate features that are common between the fan case assembly 10 and the fan case assembly 210. The description of the fan case assembly 10 is incorporated by reference to apply to the fan case assembly 210, except in instances when it conflicts with the specific description and the drawings of the fan case assembly 210.

The fan case assembly 210 includes, among other components, a case 220, a plurality of vanes 222, and an inlet distortion mitigation system 224 as shown in FIGS. 7-10. The case 220 extends circumferentially at least partway about the axis 11 to define an outer boundary of the gas path 25 of the gas turbine engine 110. The case 220 is formed to define a plenum 226 that extends circumferentially at least partway about the axis 11 and is open to the gas path 25 of the gas turbine engine 110. The plurality of vanes 222 are arranged in the plenum 226. The plurality of vanes 222 are spaced apart circumferentially about the axis 11 to define a plurality of inlet openings 228 in fluid communication with the plenum 226. The inlet distortion mitigation system 224 is configured to control fluid communication between the plenum 226 and the gas path 25 of the gas turbine engine 110.

The inlet distortion mitigation system 224 includes a movable closure 230 and a control unit 232 as shown in FIGS. 7-10. The movable closure 230 is mounted for axial movement relative to the case 220 between a slot position as shown in FIG. 9 and a plenum position as shown in FIG. 10. The control unit 232 is configured to move the movable closure 230 between the different positions in response to preselected operating conditions to control circumferential flow through the plenum 226.

The movable closure 230 includes a band 240 and a plurality of flanges 242 as shown in FIGS. 8-10. The band 240 extends circumferentially at least partway about the axis 11. The plurality of flanges 242 are spaced apart circumferentially about the axis 11. Each flange 242 extends extend axially from the band 240 radially outward of the vanes 222 in line with the plurality of vanes 222. In other words, each plurality of flanges 242 are circumferentially aligned with one of the vanes 222 included in the plurality of vanes 222. The plurality of flanges 242 are located radially outward of the vanes 222.

Unlike the movable closure 30 of the embodiment of FIGS. 2-4, each flange 242 of the plurality of flanges 242 does not include a cutout 46. Rather, the terminal end of each flange 242 is shaped to match the shape of the plenum 26. In this way, when the movable closure 230 is in the slot position, the flange 242 extends into the plenum 226 to divide the plenum 226 into a plurality of slots to block circumferential flow through the plenum 226.

In the plenum position, each flange 242 is spaced apart from the plenum 226 to allow circumferential flow through the plenum 226. The movable closure 230 is axially translated so that the terminal ends of each flange 242 are spaced apart from the plenum 226 to allow circumferential flow through the plenum 226.

In the illustrative embodiment, the movable closure 230 further includes a rod 244 as shown in FIGS. 9 and 10. The rod 244 is coupled to the band 240 and extends radially outward through the case 220.

Turning again to the case 220, the case 220 includes an outer section 234 and an inner section 236 as shown in FIG. 8. The outer section 234 is coupled to the inner section 236 to form the case 220.

The inner section 236 of the case 220 further includes a plurality of pockets 238 as shown in FIG. 8. The plurality of pockets 238 each extend axially through the case 220 radially outward of the vanes 222 in line with each of the vanes 222. Each flange 242 is located in one of the pockets 238 and slides within the corresponding pocket 238 as the movable closure 230 axially translates relative to the case 220.

When dealing with embedded inlet distortion, there may be a steep trade between stall margin and performance of the engine. There may be points during a mission or moments with maneuvers where it may be desirable to incorporate a different available stall margin or to be able to more evenly distribute flows. Attempting to solve the worst stall condition, while maintaining performance over all of the cycle or flight conditions may be difficult and result in compromised efficiency or a limited flight envelope.

Therefore, the fan 112 includes an inlet distortion mitigation system 24, 224 which includes the movable closure 30, 230 configured to control fluid communication between the plenum 26, 226 and the gas path 25. The plenum 26, 226 is formed in the case 20, 220 at the leading edge 16 of the fan blades 14. The plurality of vanes 22, 222 are arranged in the plenum 26, 226.

In the first condition, or the slot position, the movable closure 30, 230 extends into the plenum 26, 226 so that the vane 22, 222 continues radially. This blocks circumferential flow through the plenum 26, 226. Each slot 48 between adjacent vane 22 and flange 42 has a forward leaning cross-sectional shape. In a second condition, or the plenum position, the movable closure 30, 230 slides axially to permit circumferential flows around the plenum 26. This permits air pressure and flows to better equalize circumferentially to improve stall margin.

The movable closure 30, 230 may slide axially forward from the closed position to the open position. Alternatively, the movable closure 30, 230 may slide axially aft from the closed position to the open position.

This permits some stall margin benefit in the first condition and then an enhanced capability as desired, with an axially sliding series of vane extensions, i.e. the flanges 42, 242. This permits the turbofan engine 110 to be designed with two potential configurations which allow it to be optimized to different conditions with one assembly. This is beneficial to eliminating a troublesome trade between stall margin and performance potentially, or may be able to handle more extreme inlet distortion during Forward leaning cross-sectional shape slots 48 at the leading edge 16 of the fan blades 14 may be effective tip treatments that recirculate air locally at the fan blade leading edge tip. The slots 46 may be leaned tangentially/circumferentially as well as leaned forward. In some embodiments, the slots/openings may be aligned to the blade angle instead of purely axial at the opening. The may be a hole in the case 20, 220 for an actuator that drives the movable closure forward and aft without having an effect on aero performance of the treatment.

The movable closure 30 includes the flanges 42 that fill the plenum 26 when in the slot position. The flanges 42 include cutouts 46 that align with the plenum 26 when slide axially. This may make radial attachment of the end feasible for outside the case actuation systems. The arrangement would be ganged together and opened/closed all at once likely. Another potential embodiment could be to have some portions of the circumference not treated (such as top dead center where treatment is less likely to be needed) and then simplify the hardware.

The control unit 32, 232 then moves the movable closure 30, 230 based on the measurements or programed responses. In some embodiments, the flanges 42, 242 of the movable closure 30, 230 may be ganged to local sectors and just activated in several different portions as needed to more locally control stall. For example, if a select sector needs to flow across its region, but not as a fully hoop.

The control unit 32, 232 is configured to use sensor inputs from a sensor to control operation of the movable closure 30, 230. The sensor may include one of or a combination of a static wall pressure sensor, an altitude sensor, sensors configured to detect twisting of the fan blades 14, sensors configured to detect the tip timing of the fan blades 14, sensors configured to measure a rotational speed of the fan blades 14, a dynamic pressure transducer sensor. The combination of some sensors may provide data to engage mitigation of the effects of distortion, while other sensors may detect the maneuvers or mission phase.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A fan case assembly adapted for use with a gas turbine engine, the fan case assembly comprising:

a case that extends circumferentially at least partway about an axis to define an outer boundary of a gas path of the gas turbine engine, the case formed to define a plenum that extends circumferentially at least partway about the axis and is in fluid communication with the gas path of the gas turbine engine, a plurality of vanes arranged in the plenum and spaced apart circumferentially about the axis to define a plurality of inlet openings in fluid communication with the plenum, and an inlet distortion mitigation system including a movable closure mounted for movement relative to the fan case and a control unit, the movable closure configured to axially translate relative to the case to move between a slot position in which the movable closure divides the plenum into a plurality of slots to block circumferential flow through the plenum and a plenum position in which the movable closure is spaced apart from the plenum to allow circumferential flow through the plenum, and the control unit configured to move the movable closure between the slot position and the plenum position in response to preselected operating conditions to minimize negative effects of pressure and swirl distortions in the gas turbine engine to improve stall margin for the gas turbine engine.

2. The fan case assembly of claim 1, wherein the movable closure is shaped to define a plurality of cutouts and wherein each cutout of the plurality of cutouts are axially aligned with the plenum to allow circumferential flow through the plenum when the movable closure is in the plenum position.

3. The fan case assembly of claim 2, wherein the movable closure includes a band that extends circumferentially at least partway about the axis and a plurality of flanges spaced apart circumferentially about the axis that each extend axially from the band radially outward of the plurality of vanes, and wherein each flange of the plurality of flanges is shaped to include one cutout of the plurality of cutouts.

4. The fan case assembly of claim 3, wherein the case is formed into include a plurality of pockets that extend axially into the case radially outward of the plurality of vanes and each pocket of the plurality of pockets is circumferentially aligned with one vane of the plurality of vanes.

5. The fan case assembly of claim 2, wherein each cutout of the plurality of cutouts has a cross-sectional shape that matches a cross-sectional shape of a portion of the plenum when viewed in the circumferential direction.

6. The fan case assembly of claim 1, wherein the movable closure includes a band that extends circumferentially at least partway about the axis and a plurality of flanges spaced apart circumferentially about the axis that each extend axially from the band radially outward of the plurality of vanes, and wherein the plurality of flanges extend into the plenum to block circumferential flow through the plenum when the movable closure is in the slot position.

7. The fan case assembly of claim 1, wherein the control unit includes at least one actuator coupled to the movable closure and configured to drive axial translation of the movable closure, a controller coupled to the at least one actuator and configured to direct the at least one actuator to axially translate the movable closure to the slot position when the gas turbine engine is in a cruise condition included in the preselected operating conditions.

8. The fan case assembly of claim 7, wherein the control unit further includes a memory coupled to the controller, the memory including a plurality of preprogrammed aircraft maneuvers that each correspond to one of the slot position and the plenum position, and the controller is configured to detect a preprogrammed aircraft maneuver included in the plurality of preprogrammed aircraft maneuvers on the memory and direct the at least one actuator to move the movable closure to a corresponding position in response to detecting the preprogrammed aircraft maneuver.

9. The fan case assembly of claim 8, wherein the control unit further includes at least one sensor coupled to the controller and configured to measure one of pressure, air speed, altitude, blade tip timing, blade rotational speed, attitude, and acceleration, and wherein the controller is configured to receive a measurement from the at least one sensor and direct the at least one actuator to move the movable closure to a corresponding position in response to the measurement of the at least one sensor.

10. The fan case assembly of claim 7, wherein the control unit further includes at least one sensor coupled to the controller and configured to measure one of pressure, air speed, altitude, blade tip timing, blade rotational speed, attitude, and acceleration, and wherein the controller is configured to receive a measurement from the at least one sensor and direct the at least one actuator to move the movable closure to a corresponding position in response to the measurement of the at least one sensor.

11. A gas turbine engine comprising:

a fan including a fan rotor configured to rotate about an axis of the gas turbine engine and a plurality of fan blades coupled to the fan rotor for rotation therewith, a fan case assembly that extends circumferentially around the plurality of fan blades radially outward of the plurality of fan blades, the fan case assembly comprising:

a case that extends circumferentially at least partway about the axis, the case formed to define a plenum that extends circumferentially at least partway about the axis and is in fluid communication with the gas path of the gas turbine engine, a plurality of vanes arranged in the plenum and spaced apart circumferentially about the axis to define a plurality of inlet openings in fluid communication with the plenum, and an inlet distortion mitigation system including a movable closure mounted for movement relative to the fan case and a control unit, the movable closure configured to axially translate relative to the fan case to move between a slot position in which the movable closure divides the plenum into a plurality of slots and a plenum position in which the movable closure is spaced apart from the plenum, and the control unit configured to move the movable closure between the slot position and the plenum position in response to preselected operating conditions to minimize pressure and swirl distortions in the gas turbine engine while providing additional stall margin.

12. The gas turbine engine of claim 11, wherein the movable closure is shaped to define a plurality of cutouts and wherein each cutout of the plurality of cutouts are axially aligned with the plenum to allow circumferential flow through the plenum when the movable closure is in the plenum position.

13. The gas turbine engine of claim 12, wherein the movable closure includes a band that extends circumferentially at least partway about the axis and a plurality of flanges spaced apart circumferentially about the axis that each extend axially from the band radially outward the plurality of vanes, and wherein each flange of the plurality of flanges is shaped to include one cutout of the plurality of cutouts.

14. The gas turbine engine of claim 13, wherein the case is formed into include a plurality of pockets that extend axially into the case radially outward of the plurality of vanes and each pocket of the plurality of pockets is circumferentially aligned with one vane of the plurality of vanes.

15. The gas turbine engine of claim 11, wherein the movable closure includes a band that extends circumferentially at least partway about the axis and a plurality of flanges spaced apart circumferentially about the axis that each extend axially from the band radially outward of the plurality of vanes, and wherein the plurality of flanges extend into the plenum to block circumferential flow through the plenum when the movable closure is in the slot position.

16. The gas turbine engine of claim 11, wherein the control unit includes at least one actuator coupled to the movable closure and configured to drive axial translation of the movable closure, a controller coupled to the at least one actuator and configured to direct the at least one actuator to axially translate the movable closure to the slot position when the gas turbine engine is in a cruise condition included in the preselected operating conditions.

17. The gas turbine engine of claim 16, wherein the control unit further includes a memory coupled to the controller, the memory including a plurality of preprogrammed aircraft maneuvers that each correspond to one of the slot position and the plenum position, and the controller is configured to detect a preprogrammed aircraft maneuver included in the plurality of preprogrammed aircraft maneuvers on the memory and direct the at least one actuator to move the movable closure to a corresponding position in response to detecting the preprogrammed aircraft maneuver.

18. The gas turbine engine of claim 17, wherein the control unit further includes at least one sensor coupled to the controller and configured to measure one of pressure, air speed, altitude, blade tip timing, blade rotational speed, attitude, and acceleration, and wherein the controller is configured to receive a measurement from the at least one sensor and direct the at least one actuator to move the movable closure to a corresponding position in response to the measurement of the at least one sensor.

19. The gas turbine engine of claim 16, wherein the control unit further includes at least one sensor coupled to the controller and configured to measure one of pressure, air speed, altitude, blade tip timing, blade rotational speed, attitude, and acceleration, and wherein the controller is configured to receive a measurement from the at least one sensor and direct the at least one actuator to move the movable closure to a corresponding position in response to the measurement of the at least one sensor.

20. A method comprising:

providing a fan case assembly adapted for use with a gas turbine engine, the fan case assembly including a case that extends circumferentially at least partway about an axis of the gas turbine engine and is formed to define a plenum that extends circumferentially at least partway about the axis, a plurality of vanes arranged in the plenum and spaced apart circumferentially about the axis to define a plurality of inlet openings in fluid communication with the plenum, and an inlet distortion mitigation system including a movable closure mounted for axial translation relative to the case, locating the movable closure in a slot position in which the movable closure divides the plenum into a plurality of slots to block circumferential flow through the plenum, and translating the movable closure from the slot position to a plenum position in which the movable closure is spaced apart from the plenum to allow circumferential flow through the plenum in response to one preselected operating condition included in a plurality of preselected operating conditions.

* * * * *